No. 676,972. Patented June 25, 1901.
J. A. ASHLEY.
FARM TRUCK.
(Application filed Mar. 20, 1901.)
(No Model.)
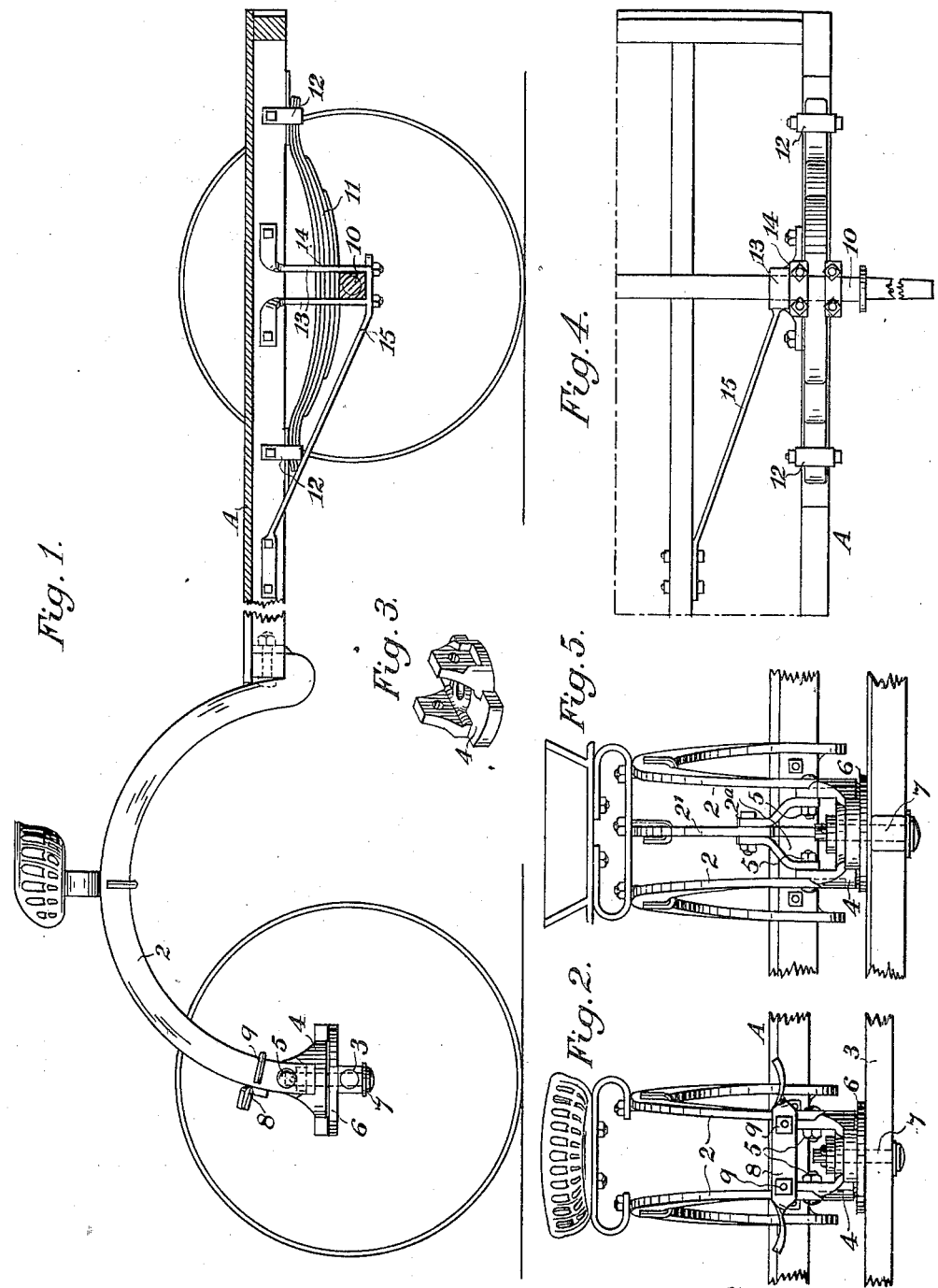

UNITED STATES PATENT OFFICE.

JAY A. ASHLEY, OF YUBA CITY, CALIFORNIA.

FARM-TRUCK.

SPECIFICATION forming part of Letters Patent No. 676,972, dated June 25, 1901.

Application filed March 20, 1901. Serial No. 52,043. (No model.)

*To all whom it may concern:*

Be it known that I, JAY A. ASHLEY, a citizen of the United States, residing at Yuba City, county of Sutter, State of California, have invented an Improvement in Farm-Trucks; and I hereby declare the following to be a full, clear, and exact description of the same.

My invention relates to improvements in vehicles of the class used in gathering fruit in orchards and vineyards or where movement or turning in a limited space is often necessary, where the small size, lightness, strength, and rigidity of such a vehicle are of great importance, and wherein ease of riding is essential, that the fruit may not be bruised in transporting over rough ground.

My invention consists, essentially, first, of making a truck with a crane-neck, one end of which is secured to the body of the truck and the other adapted to rest upon a contracted turn-table in such a way that the weight of the forward part of the truck-body is borne directly upon the axle, and, second, in the mounting of the other end of the truck on the rear axle.

It also comprises details more fully to be hereinafter set forth, having reference to the accompanying drawings, in which—

Figure 1 is a part longitudinal elevation and part longitudinal section of a truck embodying my invention. Fig. 2 is a front view of the crane-neck. Fig. 3 is a perspective view of the foot. Fig. 4 is a portion of a plan of the body of the truck looking from below. Fig. 5 is a modification of Fig. 2.

A represents the body of the truck, which may be of any suitable size.

2 represents the members of the crane-neck or arch by which the forward end of the truck is connected with the axle 3. This crane-neck is made ordinarily of two semicircularly-curved bars converging toward their front end and suitably seated upon a foot 4 and held in position, as by bolts 5. This foot rests upon the turn-table 6, secured to the axle. A king-bolt 7 holds the parts together.

The purpose of making the crane-neck in the form shown is to obviate the strain usual in such connections where their forward portion, by which they attach to the axle, makes an obverse curve with the main body of the neck, while in my invention, the neck being made in the form of an arc of a circle, one extremity of this arc being secured to the truck-body, the other resting directly over its point of support upon the axle, a line passed vertically through the axle would be approximately tangent to said arc.

Another point to be noted is that the foot or member 4 is not of the ordinary disk form, but is very much narrowed in the direction of the line of the axle. This is for the purpose of allowing the body to adjust itself in relation to the wheels, thus maintaining, as far as the character of the ground will permit, a horizontal position. By reason of this narrowed foot the strain on the axle, neck, and body caused by the unevenness of the ground is further greatly relieved, there is no severe wrenching of the parts, and the danger of breaking this foot is greatly lessened as one or the other of the forward wheels strikes a projection or drops into a depression.

A cross-bar 8, secured to the neck, as by clips 9, offers a suitable foot-support for the driver. In large trucks I sometimes add a third member 2' to the crane-neck, having its forward end separated at 2ᵃ and secured to either side of the foot 4.

The second part of my invention is in the manner of mounting the rear portion of the body A on the rear axle.

In wagons where a "reach" connects the front and rear axles the wagon-bed does not exert any pull on the rear axle, but simply rests upon the springs and axle. In trucks of this character the body itself acts as a reach, and consequently the whole weight of the rear axle and connections is drawn forward by the body. Where springs are interposed between the body and the axle, the springs themselves ordinarily are subject to a strain in two directions—vertical, or that of compression by the load, and horizontal or draft strain. In my invention the axle 10 has the springs 11 secured to it, and their ends rest upon the body, as shown, being freely slidable in the clips 12 in order to adjust themselves to the varying pressure. Stirrups 13 inclose the axle in such manner as to allow it to have a vertical sliding movement therein. These stirrups bear against the spring at 14 to prevent any longitudinal movement of the axle.

To the bottom of the stirrups are secured draft-rods 15, which extend forward and attach to the body, so that the springs and axle are entirely relieved of all draft strain. So no matter what the amount of the load or the amount of compression of the springs or how near the axle approaches the bed the draft is always on the rods and from the bottom of the stirrups.

Having thus described my invention, what I claim as new, and desire to secure by Letters Patent, is—

1. A truck consisting in combination of a body, an arch connection by which the forward end of said body is supported upon the front axle, the forward end of said arch having an abutment directly over and upon said axle and the rear end of the body supported upon springs secured to the rear axle, stirrups in which said axle has a free vertical sliding movement, and means by which the stirrups are relieved against draft strains.

2. In a truck, the combination with a body, of a segmental arch connection of said body and the forward axle, said arch having an abutment dependent from the forward end and resting directly over the center of the axle whereby a vertical line through the center of the axle is approximately tangent to the periphery of the arch.

3. In a truck, the combination with a body, of a crane-neck composed of rigid segmental bars, converging toward their forward ends, and having a seat directly over the central portion of the axle, said seat narrowed in the direction of the line of the axle.

4. In a truck, the combination with a body of a crane-neck composed of rigid arched bars converging toward their forward ends, secured to a seat upon the front axle, said seat consisting of a plate narrowed in the direction of the line of the axle, and said arched bars approximately tangent to a line through the center of and vertical to the axle.

5. In a truck the combination with a rear axle body and supporting-springs therefor, of stirrups inclosing said axle, and in which the axle is movable vertically and draft-rods secured to said stirrups and to the body whereby the springs are relieved of all draft strains.

6. A truck consisting in combination of a body, a crane-neck composed of segmental bars, said bars having their forward ends secured to a member of a fifth-wheel, said member narrowed in the direction of the line of the axle, the other member consisting of a disk plate secured to the axle, the rear portion of the truck supported freely upon springs on the rear axle, stirrups in which said axle is movable freely and vertically, and draft-rods secured to the bottom of said stirrups and to the said body.

In witness whereof I have hereunto set my hand.

JAY A. ASHLEY.

Witnesses:
F. B. NOYES,
A. C. McLAUGHLIN.